2 Sheets—Sheet 1.

J. M. POOLE.

MACHINES FOR GRINDING ROLLERS.

No. 7,240. Reissued July 25, 1876.

Witnesses:
William Hayes
Alfred D. Poole

Inventor.
J. M. Poole

N. PETERS, PHOTO-LITHOGRAPHER, WASHINGTON, D. C.

2 Sheets—Sheet 2.

J. M. POOLE.

MACHINES FOR GRINDING ROLLERS.

No. 7,240. Reissued July 25, 1876.

Witnesses:
William Hayes
Alfred D. Poole

Inventor:
J. Morton Poole

N. PETERS, PHOTO-LITHOGRAPHER, WASHINGTON, D. C.

UNITED STATES PATENT OFFICE.

J. MORTON POOLE, OF WILMINGTON, DELAWARE, ASSIGNOR TO HIMSELF, WILLIAM T. PORTER, AND THOMAS S. POOLE.

IMPROVEMENT IN MACHINES FOR GRINDING ROLLERS.

Specification forming part of Letters Patent No. 104,492, dated June 21, 1870; reissue No. 7,240, dated July 25, 1876; application filed May 15, 1876.

*To all whom it may concern:*

Be it known that I, J. MORTON POOLE, of the city of Wilmington and State of Delaware, have invented a new and useful Machine for Grinding Rollers; and I do hereby declare that the following is a full, clear, and exact description of the same, reference being had to the accompanying drawings, forming a part of this specification, in which—

Figure 1:
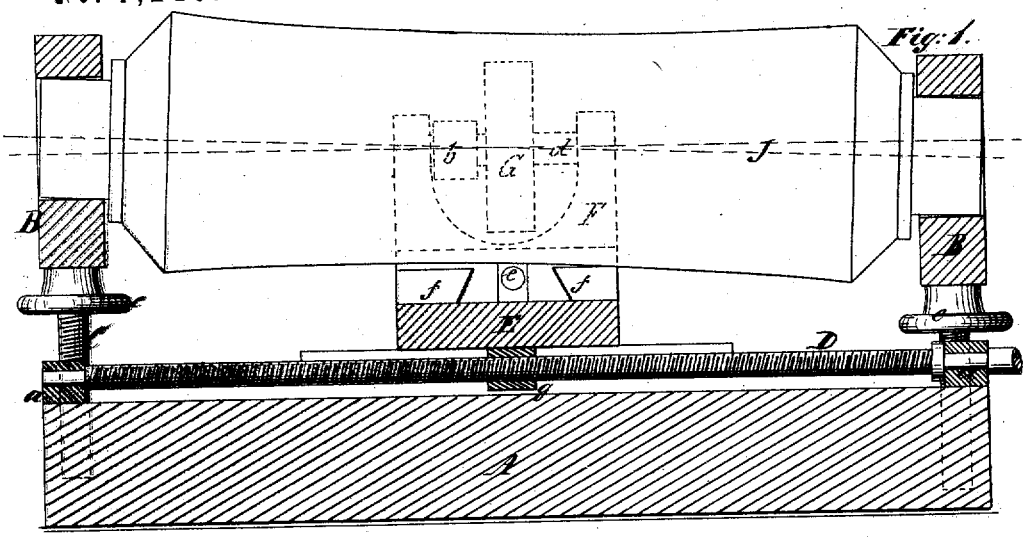
Figure 2:
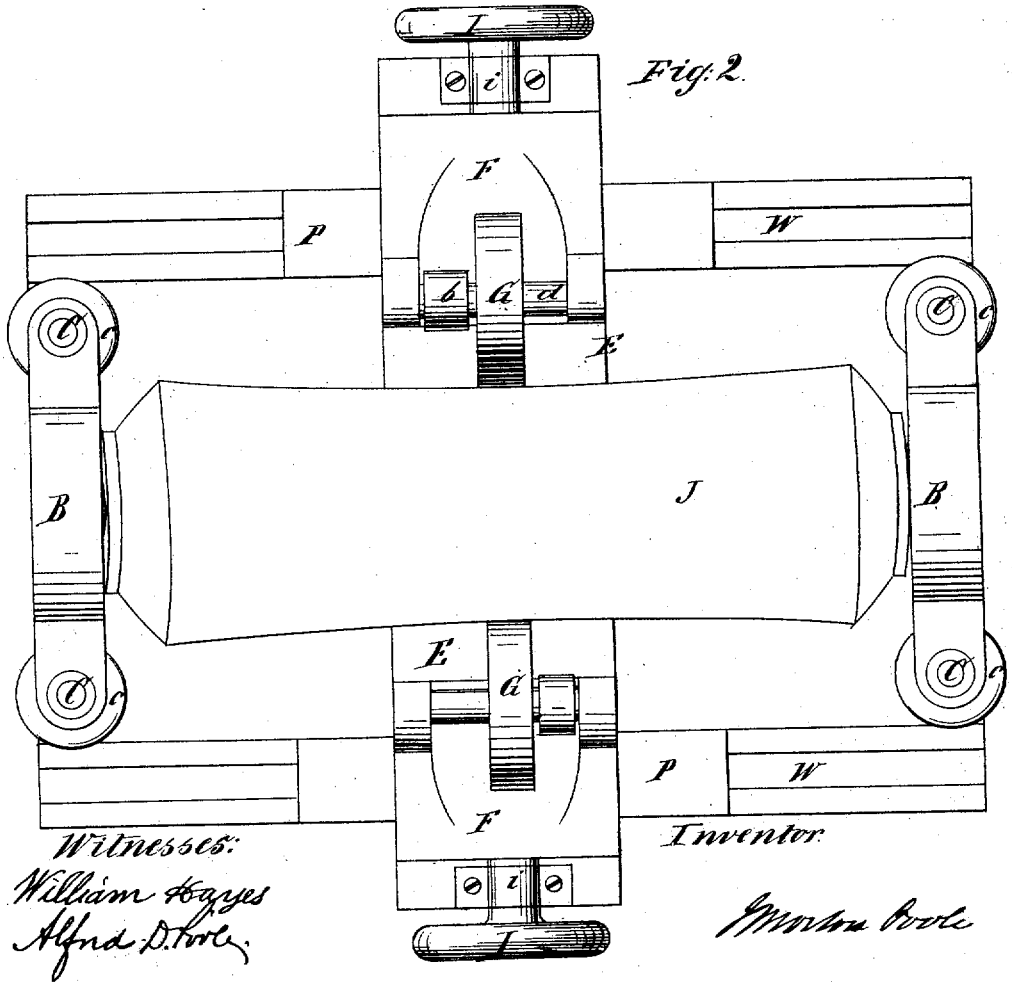
Figure 3:
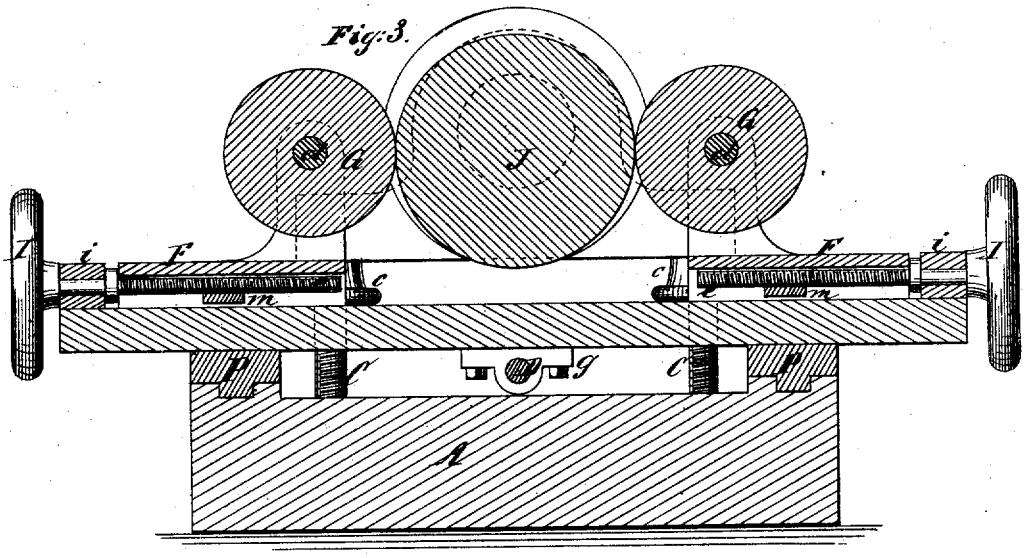

Figure 1, Sheet 1, is a central longitudinal vertical section through the machine, showing a roller which has been reduced from its ends to its middle portion. Fig. 2, Sheet 1, is a plan view. Fig. 3, Sheet 2, is a vertical transverse section.

Similar letters of reference indicate corresponding parts in the several figures.

In the construction of machines for rolling sheet metal the rollers are required to be slightly smaller in diameter at the middle portion of their length than at their ends, so that when they expand from contact with the heated sheets of metal they will be straight upon their working-faces. These rollers are constructed longer than the width of metal to be rolled, and are subjected to a high heat at their middle portion, while the ends are comparatively cool, especially when their end journals are kept cool by the application of water.

The object of my invention is to produce a roller of gradually-diminishing diameter from its ends toward its middle, forming a symmetrical longitudinal curved outline; and my invention consists in arranging the axis of the roller to be operated upon relatively to the path of the traversing grinding mechanism, as hereinafter fully described.

To enable others skilled in the art to understand my invention, I will describe one practicable mode of carrying it into effect.

In the accompanying drawings, A represents the horizontal bed of the machine, which may be of any required width or length, and which should be substantially supported upon a frame or stand similar to the stand of a turning-lathe. Upon the bed, and moving in parallel guideways W W, is a horizontal slide-rest, E, arranged transversely across the upper surface of the bed, and moved in a direction with the length of the latter by means of the screw-rod D. This screw-rod is supported on bearings *a a*, and passes through a nut, *g*, connected to the bottom of the slide-rest E, and may be turned to move or feed the latter by any suitable mechanism operating coincident with the grinding devices. Upon the slide-rest E, and held in place by suitable guides *f f*, are two tool-rests, F F, which carry the grinding-wheels G G. These grinding-wheels are fixed to spindles *d d*, on which belt-pulleys *b b* are applied, so that rotary motion can be given to them at the same time that they are moved with the slide-rest E from one end to the other of the bed A.

The tool-rests F F are arranged upon opposite sides of the longitudinal center of the machine, and can be adjusted nearer to or farther from each other by means of the screw-rods *e e* and hand-wheels I I, connected to their outer ends. The screw-rods *e e* are supported in, and prevented from having an end-wise motion by, the bearings *i i*, and pass through the nuts *m m* on the bottom of the tool-rests F F, as shown in Fig. 3.

At or near the extremities of the bed A are bearings B B, to support the roller to be operated upon. In practice these bearings should be pivoted, or otherwise so constructed as to accommodate themselves to the angle of divergence of the axis of the roller from the path of the grinding devices. A vertical adjustment is shown by means of the screw-rods C C and hand-wheels *c c*. Provision should also be made for rotating the roller while being operated upon.

Operation: The roller is supported and revolved upon the bearings B B at an angle with the longitudinal path of the grinding-surface, which path will be at a greater distance from the axis of the roller at its extremities than at any intermediate point, as shown, for example, in dotted lines, Fig. 1.

This arrangement of the several parts will, when put in operation, produce a roller gradually diminishing in diameter from its ends to its middle, and form the longitudinal curved outline shown.

Having fully described my invention, what I claim, and desire to secure by Letters Patent, is—

1. A grinding-machine constructed with suitable bearings for supporting a revolving roller to be operated upon, and provided with a longitudinally-traversing grinding mechanism, said roller being arranged at an angle with the path of the grinding-surface, so that its axis will be at a greater distance from said path at each extremity of the roller than at any intermediate point, for the purpose of producing a roller with a gradually-diminishing diameter from its ends to its middle portion, as shown.

2. A grinding-machine constructed with adjustable bearings for supporting a revolving roller to be operated upon, and provided with a longitudinally-traversing grinding mechanism, for the purpose specified.

J. MORTON POOLE.

Witnesses:

WILLIAM HAYES,
ALFRED POOLE.